May 29, 1962 G. F. CEROFOLINI 3,037,171
TRANSISTOR TONE GENERATOR AND POWER AMPLIFIER
Original Filed Feb. 11, 1959
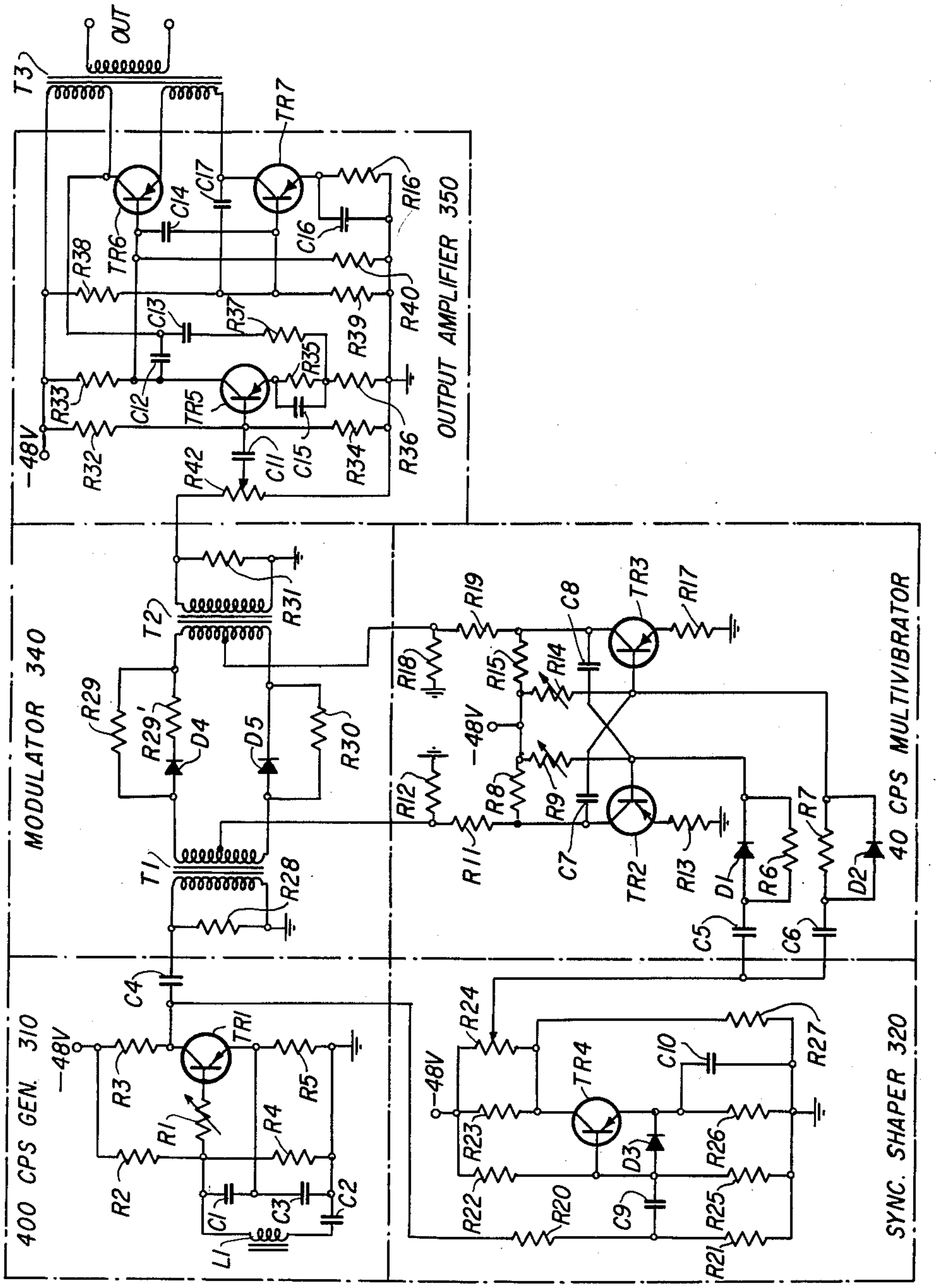
INVENTOR.
G. F. Cerofolini
BY
C. A. Gulbransen
Atty.

3,037,171
Patented May 29, 1962

3,037,171

TRANSISTOR TONE GENERATOR AND POWER AMPLIFIER

Gabriele F. Cerofolini, Milan, Italy, assignor to Automatic Electric Laboratories, Inc., a corporation of Delaware Original application Feb. 11, 1959, Ser. No. 792,650, now Patent No. 2,994,833, dated Aug. 1, 1961. Divided and this application Dec. 31, 1959, Ser. No. 863,225
6 Claims. (Cl. 331—108)

This invention relates to a transistor tone generator, and more particularly to an arrangement for producing a modulated tone such as is required in a telephone exchange. The present application is a division of my copending application Serial No. 792,650, filed February 11, 1959 for a "Transistor Tone Generator and Power Amplifier," now Patent No. 2,994,833 granted August 1, 1961.

The object of this invention is to provide an improved tone generator for producing the modulated tones required for signalling in a telephone exchange.

A feature of the invention relates to a modulator which comprises electronic switching devices, such as a pair of diodes, coupled between a source of signals and an output circuit using lower frequency signals to control the switching devices by biasing them alternately conducting and non-conducting. According to the invention, the switching devices are shunted by resistors so that in the conducting condition signals flow to the output through the switching devices, and in the non-conducting condition they flow through the resistors to the output.

Another feature relates to an arrangement in a tone generator for synchronizing a multivibrator with the output of a sinewave generator by using a portion of the sinewave output to produce square wave signals at the same frequency, differentiating these square waves to produce pulses and applying the pulses to the multivibrator. The sinewave signals and output from the multivibrator may then be combined in a modulator to obtain the desired tone.

The above-mentioned and other objects and features of this invention and the manner of obtaining them will become more apparent, and the invention itself will be best understood, by reference to the following description of an embodiment of the invention taken in conjunction with the accompanying drawing comprising a single FIGURE which is a schematic diagram of a tone generator and output amplifier.

The drawing is a schematic diagram of a ringback tone generator for a telephone system. It comprises a 400 c.p.s. generator 310, a synchronism shaper 320, a 40 c.p.s. multivibrator 330, a modulator 340, and an output amplifier 350.

The 400 c.p.s. generator 310 is a sinewave oscillator of the Clapp type, using a transistor TR1. Resistor R1 in the base circuit is variable to permit the gain to be adjusted.

To achieve good modulation it is necessary that the multivibrator 330 trigger exactly when the 400 c.p.s. signal from oscillator 310 passes through zero. To accomplish this a synchronizing signal is derived from the output of the oscillator 310. This sinewave signal is converted to a square wave form by the synchronism shaper

320, which comprises transistor TR4 operating as an amplifier-clipper. The diode D3 connected with reverse polarity across the base-emitter junction of the transistor TR4 stabilizes the operating bias point of the transistor. Output at an adjustable level is taken from the variable tap of resistor R24 in the collector circuit.

A 40 c.p.s. signal is obtained from the free-running symmetrical multivibrator 330. Resistors R9 and R14 are time constant controls. Resistors R13 and R17 give the multivibrator a proper input impedance. For synchronization the output from the synchronization shaper 320 is differentiated by the circuit comprising condenser C5, diode D1, and resistor R6; and also by the circuit comprising condenser C6, diode D2, and resistor R7. These networks differentiate the square wave and produce positive pulses. These pulses are applied respectively to the base electrodes of transistors TR2 and TR3. The resistor R24 of the synchronization shaper 320 is set so that the pulses applied to the base electrodes in the multivibrator are at the proper level to synchronize it at the desired frequency.

The modulator 340 is an electronic switch in a balanced symmetrical circuit. The diodes D4 and D5 are biased by the signal from the multivibrator 330 to be alternately conducting and non-conducting. These diodes, therefore, form a switch in the circuit between the transformers T1 and T2. According to a feature of the invention, the diodes are shunted respectively by resistors R29 and R30 to permit a reduced signal current flow during the non-conducting condition of the diodes. The 400 c.p.s. sinewave signal from the oscillator 310 is applied through coupling condenser C4 and transformer T1 to the switch circuit. From the switch this signal is coupled through transformer T2 to the output amplifier. During the interval when transistor TR2 is conducting and transistor TR3 is cut off, the diodes D4 and D5 are fully conducting and the 400 c.p.s. signal passes through them with very little attentuation; and during the interval in which transistor TR2 is cut off and transistor TR3 is conducting, the diodes D4 and D5 are substantially completely cut off and the signal flows only through the resistors R29 and R30. The 400 c.p.s. signal is thereby amplitude modulated with the coefficient of modulation depending upon the values of the resistors R29 and R30. This coefficient of modulation may be widely varied by adjusting the values of the resistors R29 and R30. The resistor R29′ is connected in series with one of the diodes to balance them more accurately.

The signal from the modulator is applied through the gain adjusting resistor R42 and coupling condenser C11 to the base electrode of transistor TR5, which comprises the first stage of the output amplifier 350. The final stage comprises transistors TR6 and TR7 in a grounded emitter configuration of the type disclosed in the original application Serial No. 792,650. Condenser C13 and resistors R36 and R37 form a feedback network which lowers the output impedance of the amplifier. Condenser C12 prevents high frequency oscillation.

In a specific embodiment of the tone generator circuit, the diodes D1, D2, and D3 may be type 610 C (Texas Instruments Company). Diodes D4 and D5 may be type 1N91, and should be matched. The transistors TR1, TR2, TR3, and TR4 may be type 2N362, and the transistors TR5, TR6, and TR7 may be type 2N43. The resistors and condensers may have values as follows:

| Resistors: | Ohms |
|---|---|
| R1 | 100,000 |
| R2 | 82,000 |
| R3 | 5,600 |
| R4 | 27,000 |
| R5 | 3,900 |
| R6 | 330,000 |
| R7 | 330,000 |
| R8 | 15,000 |
| R9 | 580,000 |
| R11 | 2,700 |
| R12 | 1,500 |
| R13 | 390,000 |
| R14 | 580,000 |
| R15 | 15,000 |
| R17 | 390,000 |
| R18 | 1,500 |
| R19 | 2,700 |
| R20 | 3,900 |
| R21 | 1,800 |
| R22 | 68,000 |
| R23 | 10,000 |
| R24 | 10,000 |
| R25 | 47,000 |
| R26 | 3,900 |
| R27 | 5,600 |
| R28 | 10,000 |
| R29 | 12,000 |
| R30 | 12,000 |
| R31 | 1,000 |
| R32 | 47,000 |
| R33 | 5,600 |
| R34 | 33,000 |
| R35 | 12,000 |
| R36 | 180 |
| R37 | 2,700 |
| R38 | 15,000 |
| R39 | 10,000 |
| R40 | 47,000 |
| R41 | 1,800 |
| R42 | 10,000 |

| Condensers: | Microfarad |
|---|---|
| C1 | 0.1 |
| C2 | 0.03 |
| C3 | 1 |
| C4 | 2 |
| C5 | 0.0005 |
| C6 | 0.0005 |
| C7 | 0.2 |
| C8 | 0.2 |
| C9 | 1 |
| C10 | 50 |
| C11 | 10 |
| C12 | 0.0002 |
| C13 | 10 |
| C14 | 10 |
| C15 | 100 |
| C16 | 50 |
| C17 | 0.0002 |
| C18 | 0.0002 |

While I have described above the principles of my invention in connection with specific apparatus, it is to be clearly understood that this description is made only by way of example and not as a limitation to the scope of my invention.

What is claimed is:

1. A tone generator comprising a source of signals at a first frequency, a multivibrator for producing signals at a second frequency, said first frequency being a multiple of said second frequency, means coupled to said source for producing square wave signals at the first frequency, means for differentiating the square wave signals to produce pulses, and means for applying the pulses to the multivibrator to synchronize the second-frequency signal output of the multivibrator with the first-frequency signals from said source, a modulator having two inputs and an output, means for coupling signals from said source to one input and signals from said multivibrator to the other input thereby producing signals at the modulator output at the first frequency modulated by the second frequency.

2. A tone generator according to claim 1, in which said means for producing square wave signals comprises a transistor for amplifying and clipping said first frequency signals.

3. A tone generator according to claim 1, in which said multivibrator comprises a pair of transistors each having emitter, base and collector electrodes, with resistance means coupling each base electrode to a source of direct-current potential, and said means for differentiating the square wave signals comprises respective circuits connected between the output of said means for producing square wave signals and the base electrode of each said transistor, each said circuit comprising a condenser in series with a resistor, said resistor of each differentiating circuit being shunted by a diode to produce pulses of only one polarity at each said base electrode.

4. A tone generator according to claim 1, in which said modulator comprises electronic switching means coupled between said source of first signals and an output circuit, resistance means shunting said switching means, said multivibrator being coupled to the switching means to bias it alternately conducting and non-conducting, so that the first signals flow to the output circuit through the switching means during conducting periods and through the resistance means during non-conducting periods.

5. A tone generator according to claim 4, in which said switching means comprises diode means.

6. A tone generator according to claim 4, including a two-wire link transformer coupled between said source of first signals and said output circuit, said switching means comprising balanced diode gate means in said link, and said second signals from the multivibrator are coupled in a simplex circuit of said link.

References Cited in the file of this patent

UNITED STATES PATENTS

| | | |
|---|---|---|
| 2,431,766 | Miller et al. | Dec. 2, 1947 |
| 2,510,075 | Clavier et al. | June 6, 1950 |
| 2,511,468 | Harrison | June 13, 1950 |
| 2,909,675 | Edson | Oct. 20, 1959 |